(12) United States Patent
Shipman et al.

(10) Patent No.: US 7,082,823 B1
(45) Date of Patent: Aug. 1, 2006

(54) DIGITAL SIGNAL PROCESSING BACK BIASED HALL EFFECT MUZZLE VELOCITY MEASUREMENT SYSTEM

(75) Inventors: John M. Shipman, Albuquerque, NM (US); Eric T. Judkins, Albuquerque, NM (US); J. Rick Martin, Rio Rancho, NM (US); Daniel E. Burkholder, Maurepas, LA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/035,656

(22) Filed: Jan. 14, 2005

(51) Int. Cl.
*G01L 5/14* (2006.01)

(52) U.S. Cl. .................................................. 73/167
(58) Field of Classification Search .................. 73/167; 324/179; 244/3.22; 702/72; 89/8; 273/357
See application file for complete search history.

(56) References Cited

U.S. PATENT DOCUMENTS

| | | | |
|---|---|---|---|
| 4,533,094 A * | 8/1985 | Geis et al. ................ 244/3.22 |
| 4,928,523 A | 5/1990 | Muhrer et al. | |
| 5,100,153 A * | 3/1992 | Welte ......................... 273/357 |
| 5,267,502 A | 12/1993 | Gent et al. | |
| 5,540,134 A * | 7/1996 | Bird, Jr. ........................ 89/8 |
| 6,020,594 A | 2/2000 | Tschudi | |
| 6,064,196 A * | 5/2000 | Oberlin et al. .............. 324/179 |
| 6,498,476 B1 | 12/2002 | Raposa et al. | |
| 6,563,302 B1 | 5/2003 | Raposa et al. | |
| 6,590,386 B1 | 7/2003 | Williams | |
| 6,644,111 B1 | 11/2003 | Cytron et al. | |
| 6,834,244 B1 * | 12/2004 | Kim ............................ 702/72 |

* cited by examiner

*Primary Examiner*—Jewel V. Thompson
(74) *Attorney, Agent, or Firm*—Dennis F. Armijo; Kurt A. Luther; Dina Khaled

(57) ABSTRACT

A system for precisely measuring muzzle exit velocity of a "muzzle loaded" mortar projectile fired from a mortar tube using two back-biased Hall effect sensors for projectile gas ring channel detection. The system includes a back-biased Hall effect sensor block, a digital resolver electronic circuit and a computer software interface. The back-biased Hall effect sensors are located in a calibrated sensor block attached to a mortar tube. As the projectile metal casing passes a face of the sensors, the sensors trigger and release, providing two electronic pulses. The pulse edges are captured in the resolver electronics, containing a discriminator circuit for filtering all input pulses to distinguish between a projectile loading event and a projectile firing event. Once a valid firing event is detected, an output of precision timers is presented serially to a computer where it is processed and displayed by a computer software interface.

18 Claims, 8 Drawing Sheets

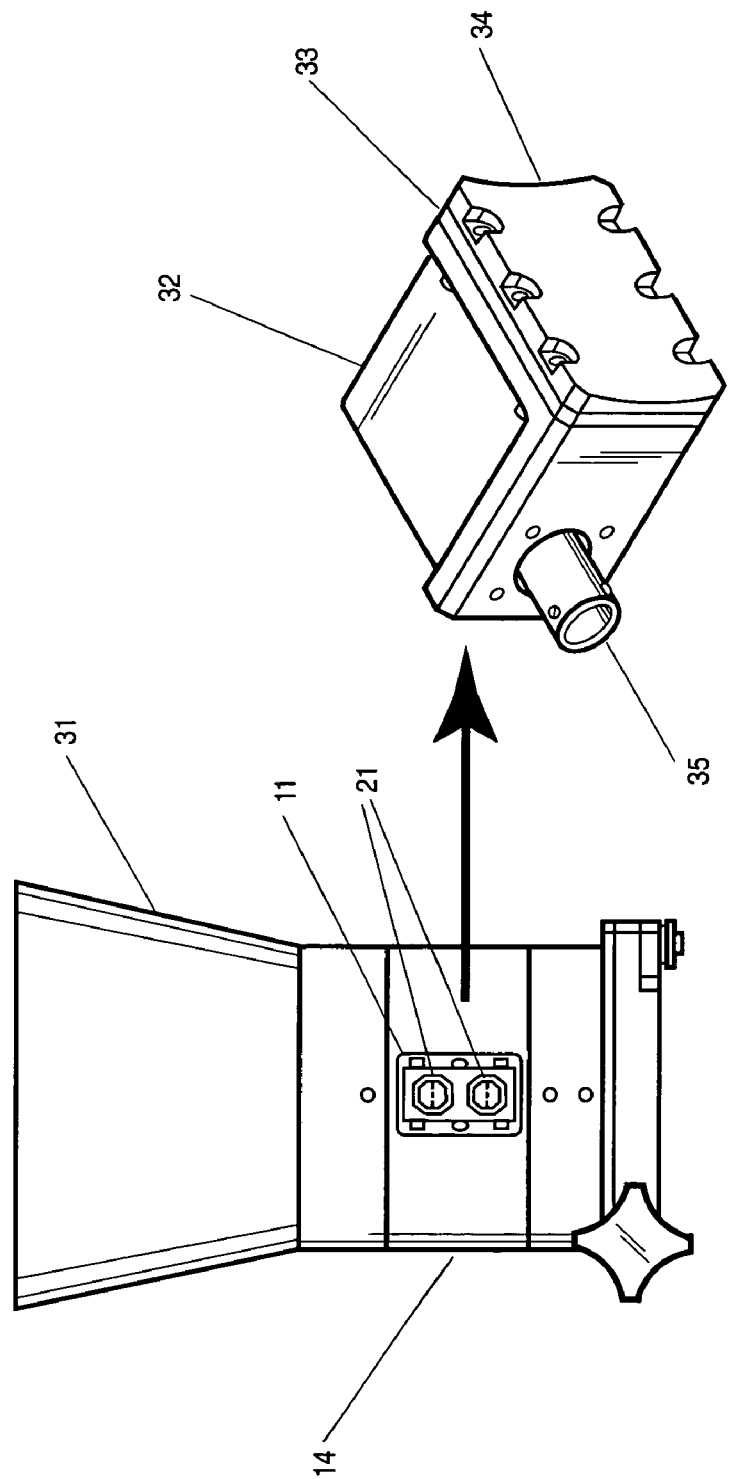

FIG-4A
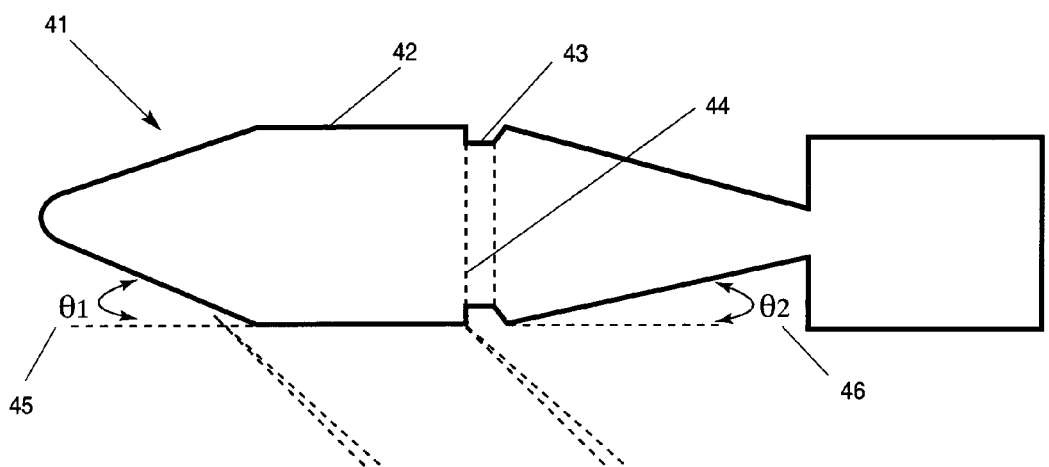
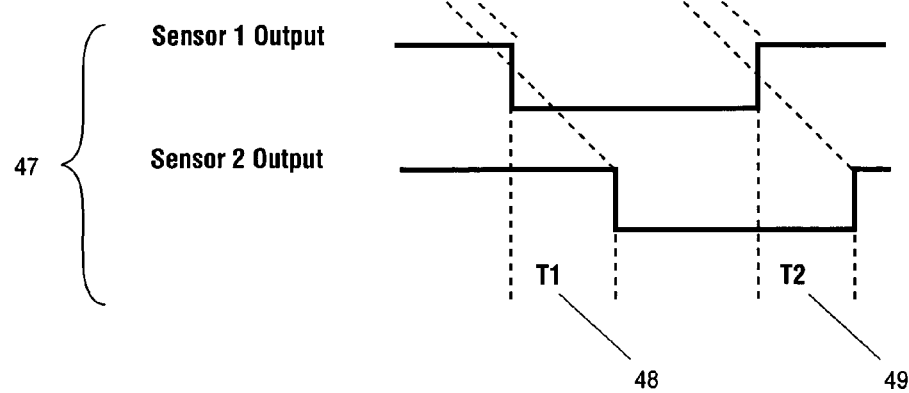
FIG-4B

FIG-8A
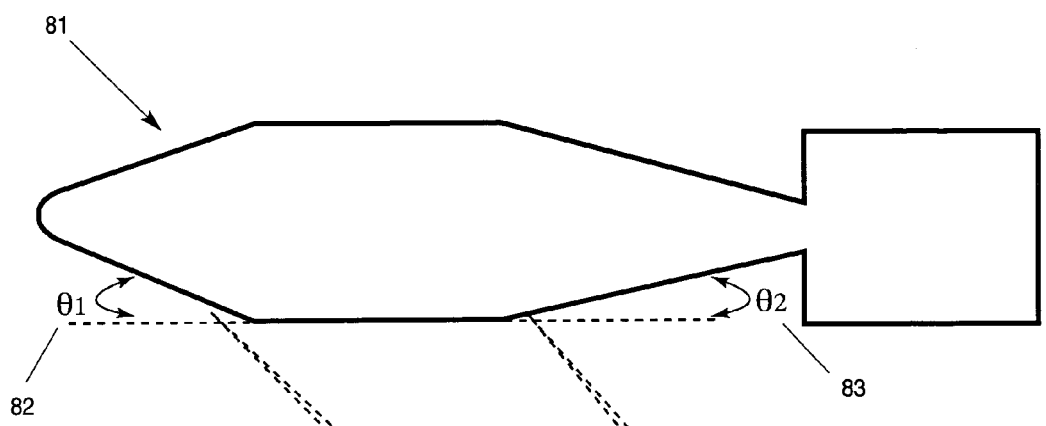
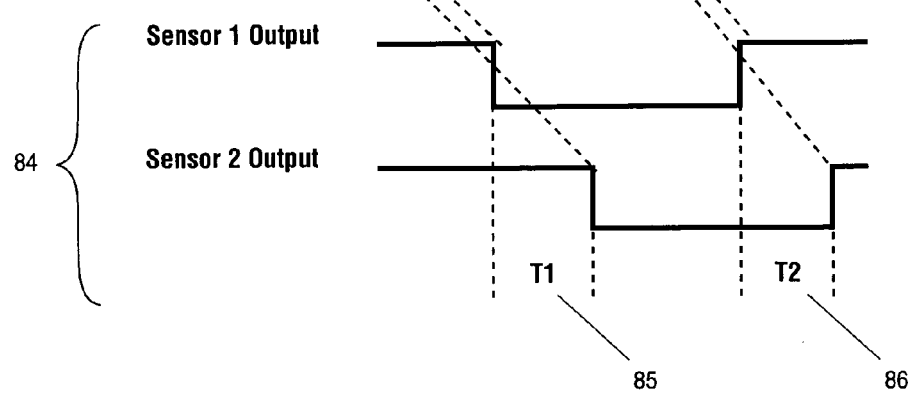
$$T = \frac{T1 - T2}{\frac{\cot\theta1}{\cot\theta2} + 1} + T2$$
FIG-8B

DIGITAL SIGNAL PROCESSING BACK BIASED HALL EFFECT MUZZLE VELOCITY MEASUREMENT SYSTEM

GOVERNMENT RIGHTS

The U.S. Government has a paid-up license in this invention and the right in limited circumstances to require the patent owner to license others on reasonable terms as provided for by the terms of DAAE30-03-D-1004, awarded by the Department of the Army.

BACKGROUND OF THE INVENTION

1. Field of the Invention (Technical Field)

The present invention relates to measuring systems and more specifically to a method and apparatus for measuring a mortar muzzle exit velocity.

2. Background Art

This present invention solves the problem of providing accurate primary instrumentation for the measurement of the velocity of a projectile at the muzzle point of exit. Many variables affect muzzle velocity. Examples include, but are not limited to barrel wear, propellant temperature, unique propellant burn rate, and air density. While some of these variables can accurately be accounted for individually, when taken in total, it is most efficient to simply measure the muzzle velocity and apply a correction factor to all subsequent firings. Radar systems presently are used to analyze the ballistic path but do not provide an actual point of exit measurement. Other existing prior art methods comprise the use of various inductive, optical, fiber optic strain gauges, and RF injection to obtain the muzzle velocity of a non-specific barrel guided projectile. The inductive approach exhibits a characteristic reduced frequency response while optical and fiber optic systems are not suitable to the combat environment or are not practical for fielding. RF injection requires that the barrel be penetrated at multiple locations which violates the military standard for barrel structural integrity.

Most all approaches must start with the same premise of detecting the round over a measured distance and calculating a time period of travel to resolve velocity. These prior art systems include:

U.S. Pat. No. 6,590,386 discloses an optical type detector and is used to detect paint balls in paint ball guns; U.S. Pat. No. 6,644,111 describes the use of a fiber optic bragg grating as a strain gauge detector; U.S. Pat. No. 6,563,302 describes the use of a voltage coil for underwater detection; U.S. Pat. No. 6,498,476 describes the use of transparent break screens for underwater detection; U.S. Pat. No. 6,064,196 describes the use of inductive coils and a magnet mounted on the projectile body; U.S. Pat. No. 6,020,594 discloses the use of two optical IR light beam assemblies; U.S. Pat. No. 5,267,502 does not disclose a muzzle velocity measuring device, but describes a computational method for predicting muzzle velocity from past doppler radar measurements using a Kalman filter or neutral network; and U.S. Pat. No. 4,928,523 discloses the use of a microwave generator to propagate energy into the gun barrel through drilled holes and measure the phase shift relative to projectile travel inside the barrel.

Single back-biased Hall effect sensors with digital signal processing (DSP) have been widely used to detect angular position and rotational speed of motion in powered shaft driven machinery by means of a multi-toothed gear wheel. It is new and non-obvious to apply this close proximity detection technique to a high-speed projectile traveling in a linear path of motion with only one target position and two rather than one sensor for detection.

The present invention is a unique system that uses back-biased digital Hall effect integrated circuit sensors with pre-conditioned digital signal processing (DSP) to accurately produce a time over distance variant function of the projectile which can be digitally resolved into precise velocity coded hexadecimal data words in digital resolver/discriminator electronics and further interpreted by a computer software interface.

SUMMARY OF THE INVENTION
(DISCLOSURE OF THE INVENTION)

This invention provides an accurate and field-ready measurement system for measuring the velocity of a projectile by the application of back-biased digital Hall effect integrated circuit sensors disposed in a sensor block to detect the ferrous metal casing of the projectile as it moves past the sensors at the muzzle point of exit. As the projectile ferrous metal casing (target) passes by the sensor's face, it concentrates the magnetic flux from the bias magnet. The sensor detects the change in flux level and translates it into a change in the sensor output, either On or Off. A thin film laser-trimmed resistor network in the preamplifier/trigger circuit is used to set and control the Hall element offset voltage and operate point. A feedback circuit is integrated into the silicon integrated circuit and is used to mitigate the effects of temperature and other variables. A discrete value capacitor is used to store a reference voltage that is directly proportional to the sensor's off state at the targets threshold magnetic field strength. The trigger circuit uses this voltage to establish the reference level for the operate point.

The output of the sensor electronics is fed through a cable into the input stage of the digital resolver electronics where both the leading and trailing edges of each sensor output pulse are captured asynchronously. These captured pulse edges start and stop two 16-bit, precision timers, which count at a frequency of 60 MHz. The output of the timer circuits along with the captured pulse edges are simultaneously fed into a discriminator circuit that logically filters the data to distinguish between a projectile loading event and a projectile firing event. This is necessary since both events will generate sensor output. Once a valid firing event has been detected, the output of the precision timers is presented serially in the form of four 8-bit binary coded words to a specifically written software program running in a computer device for processing and display.

The primary objective of the present invention is to create an on-board muzzle velocity system that accurately measures muzzle velocity by directly measuring the movement of a fired projectile at the point of exit.

Another objective of the present invention is to provide a muzzle velocity measuring system with a low weight and low power consumption and be small enough to not create a burden to the user while employing the weapon system.

Yet another objective of the present invention is to provide a muzzle velocity measuring system at a low cost.

A primary advantage of the present invention is that by having the muzzle velocity system on board the weapon, no special provisions need to be made to ensure the muzzle velocity system is pointed along the path of the projectile.

Another advantage of the present invention is the simplicity in the mounting design of the muzzle velocity measurement system on a muzzle.

Another advantage of the present invention is that due to the low power consumption, the measurement system can be battery operated remotely away from and without attachment from a continuous power supply, such as a battery. This invention is designed to draw minimal power so that the muzzle velocity system will operate for extended lengths of time.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 3A is a drawing of the mechanical detail of the sensor block integrated into a mechanical coupling.

FIG. 3B shows the preferred sensor block.

FIG. 4A is a drawing of the mechanical detail of a typical mortar projectile.

FIG. 4B shows the typical sensor outputs.

FIG. 8A is a drawing of the mechanical detail of an alternate mortar projectile.

FIG. 8b shows the typical alternate sensor outputs and timing formula.

DESCRIPTION OF THE PREFERRED EMBODIMENTS (BEST MODES FOR CARRYING OUT THE INVENTION)

Figure 1:
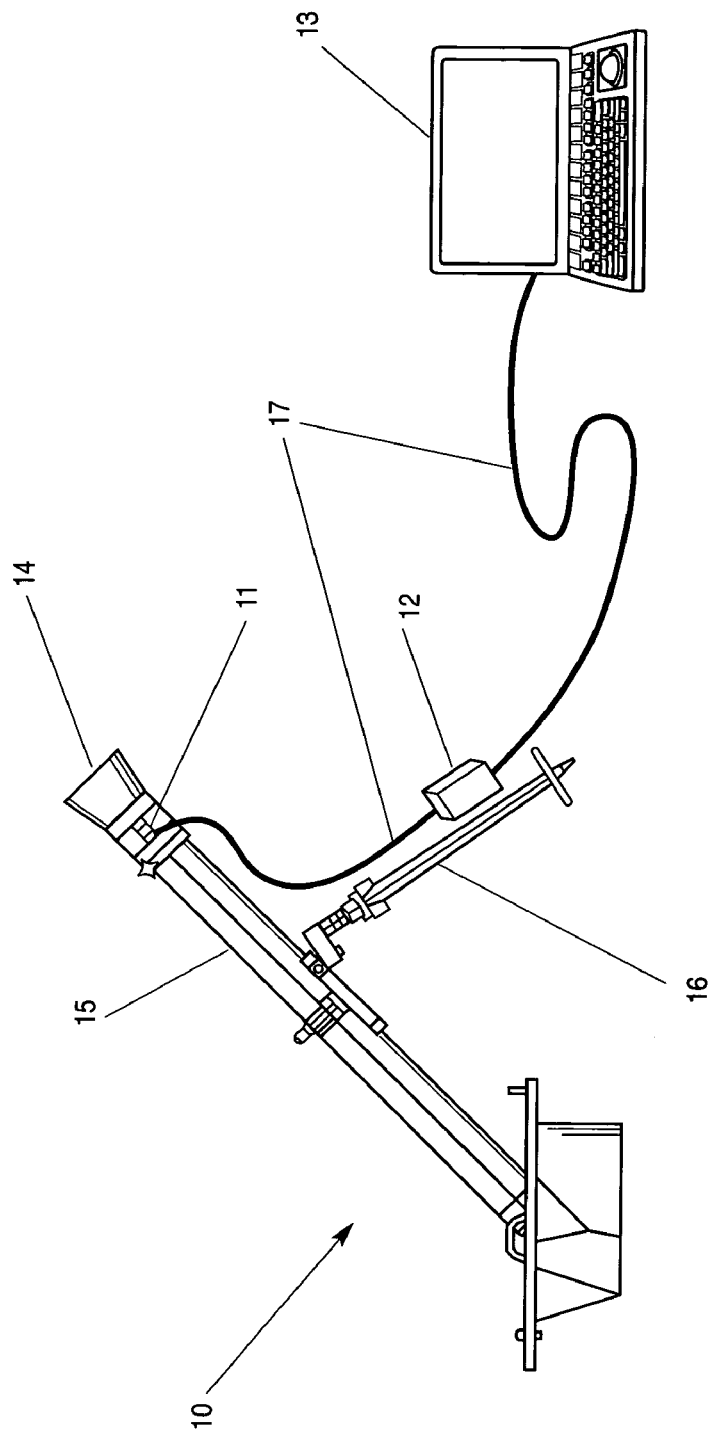
FIG. 1 is a top-level representation of the system configuration.
Figure 2:
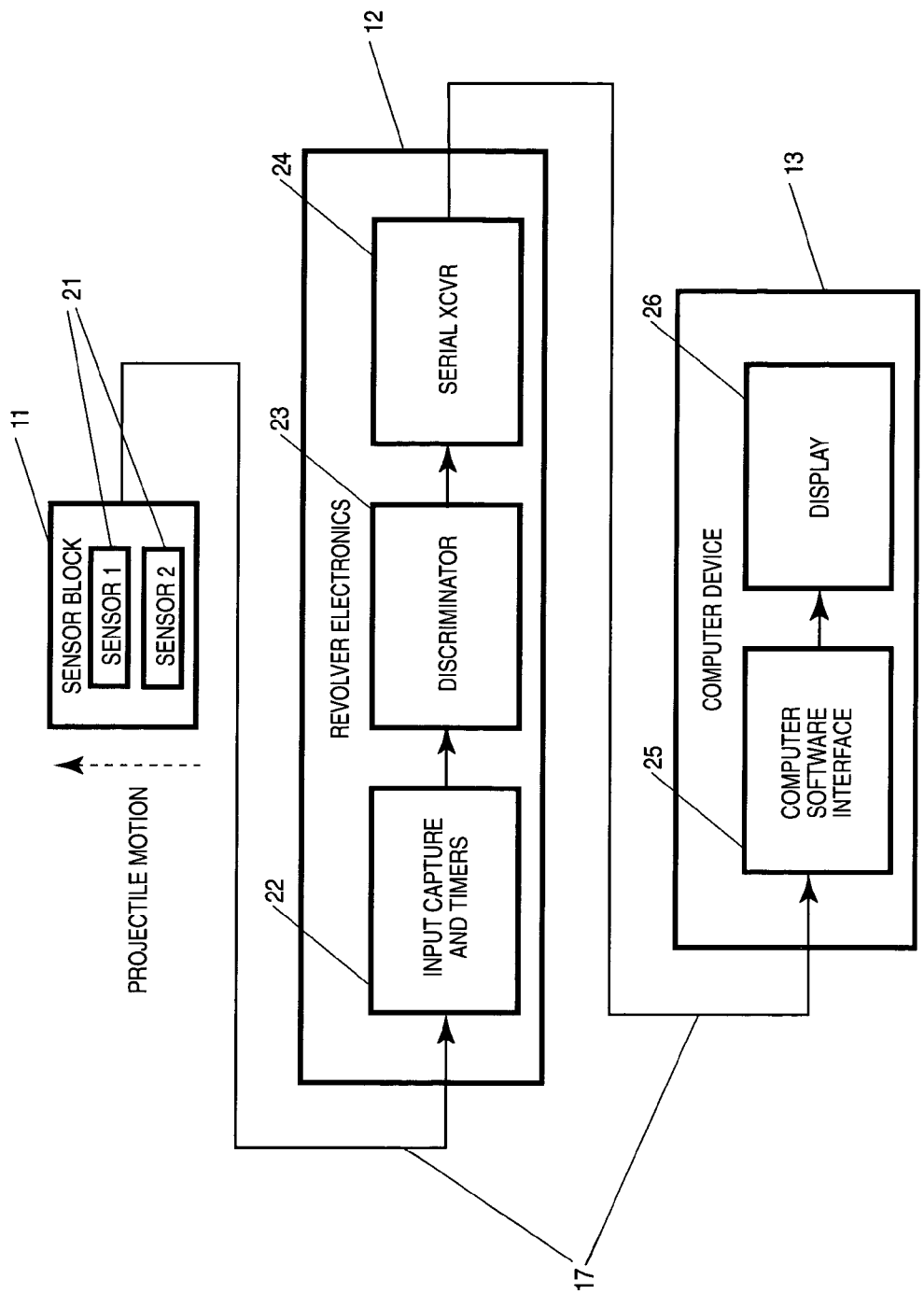
FIG. 2 is a functional block diagram of the preferred system.

A unique method and apparatus for accurately measuring the velocity of a mortar projectile is disclosed. FIGS. 1 and 2 show the typical set up for the present invention. Mortar weapon 10 is equipped with a sensor block 11, a digital resolver module 12, and a computing device 13. Sensor block 11 is integrated into a mechanical coupling 14 that is attached to mortar weapon 10 at the exit of cannon 15. In the preferred sensor block 11, two back-biased Hall effect sensors 21 are used, however more sensors could be used for a more accurate measurement. Digital resolver module 12 consists of electronics housed in a mechanical enclosure that is mechanically attached to mortar weapon 10 in an area that provides mechanical isolation from cannon 15, such as either bipod leg 16. Typical electronics for resolver module 12 include input capture and timer electronics 22, discriminator electronics 23, and serial transceiver (XCVR) 24. Computing device 13 is a host for computer software interface 25 and display 26. Cabling 17 electrically connects sensor block 11 to digital resolver module 12, and digital resolver module 12 to computing device 13.

FIGS. 3A and 3B show the preferred sensor block 11 and sensor block 11 integrated into mechanical coupling 14. Mechanical coupling 14 shown with blast deflector cone 31 is for a track-mounted mortar, and replaces the existing blast attenuation device (BAD). It is form, fit, and function equivalent to the existing BAD, and has a similar method of attachment to the cannon (not shown). It is preferably machined aluminum bored through for projectile exit (not shown), however any other similar material can be used. The bore is equivalent in design to the existing BAD, as to not change the ballistics of the projectile by allowing blast pressure relief to occur at the same point of coincidence as the end of the muzzle. A mechanical coupling 14 without blast deflection cone 31 can also be used on a dismounted mortar (not shown).

The preferred sensors 21 comprise of quad micro Hall element, micro volt amplifier, precision regulated power supply, reference threshold voltage, laser trimmed magnetic field elements, Schmitt trigger circuit with a TTL digital output device. These sensors are well known in the art.

Sensor block 11 consists of a cover housing 32 a sensor housing 33 and faceplate 34. Cover housing 32 is preferably machined aluminum and includes an electrical connector 35 for electrical cable interface to digital resolver module 12. Sensor housing 33 is machined steel for its magnetic isolation properties and bored through two places for sensor 21 installation. Sensors 21 are calibrated mechanically during installation in the sensor housing 33 and electrically following installation. The calibration process is discussed fully below. Faceplate 34 is preferably machined titanium for its non-magnetic properties and mechanical strength and is counter bored in two places for seating of sensors 21.

As shown in FIG. 4A, a mortar projectile 41 is typically manufactured with a flat band 42 around the largest point of circumference as shown in FIG. 4A. While the rest of the mortar surface is conically tapered 45 and 46, flat band 42 is immediately succeeded by a channel 43 around the circumference of projectile 41. Channel 43 provides the seat for a non-ferrous elastomer ring (not shown) also referred to as an orbturator "gas" ring used to form the gas seal during firing. The arrangement of flat band 42 and channel 43 furnish Hall effect sensor block 11 with an ideal, fixed position release 44 point for precisely measuring velocity, as each sensor will release at the same point on the mortar surface, this point being orbturator ring channel 43 which provides a square mechanical edge for detection.

FIG. 4B shows the typical sensor output 47 produced when the mortar projectile passes each sensor 21. Each sensor triggers off of the decreasing gap between the sensor and the nose cone 45 of the projectile providing the time differential T1 48. Each sensor then releases at orbturator ring channel edge 44 providing time differential T2 49. T1 48 and T2 49 are both captured and used by digital resolver module 12 to distinguish between a loading event and a firing event. Digital resolver 12 then transfers the value of T2 49 to computing device 13 where it is used to calculate velocity.

Figure 5:
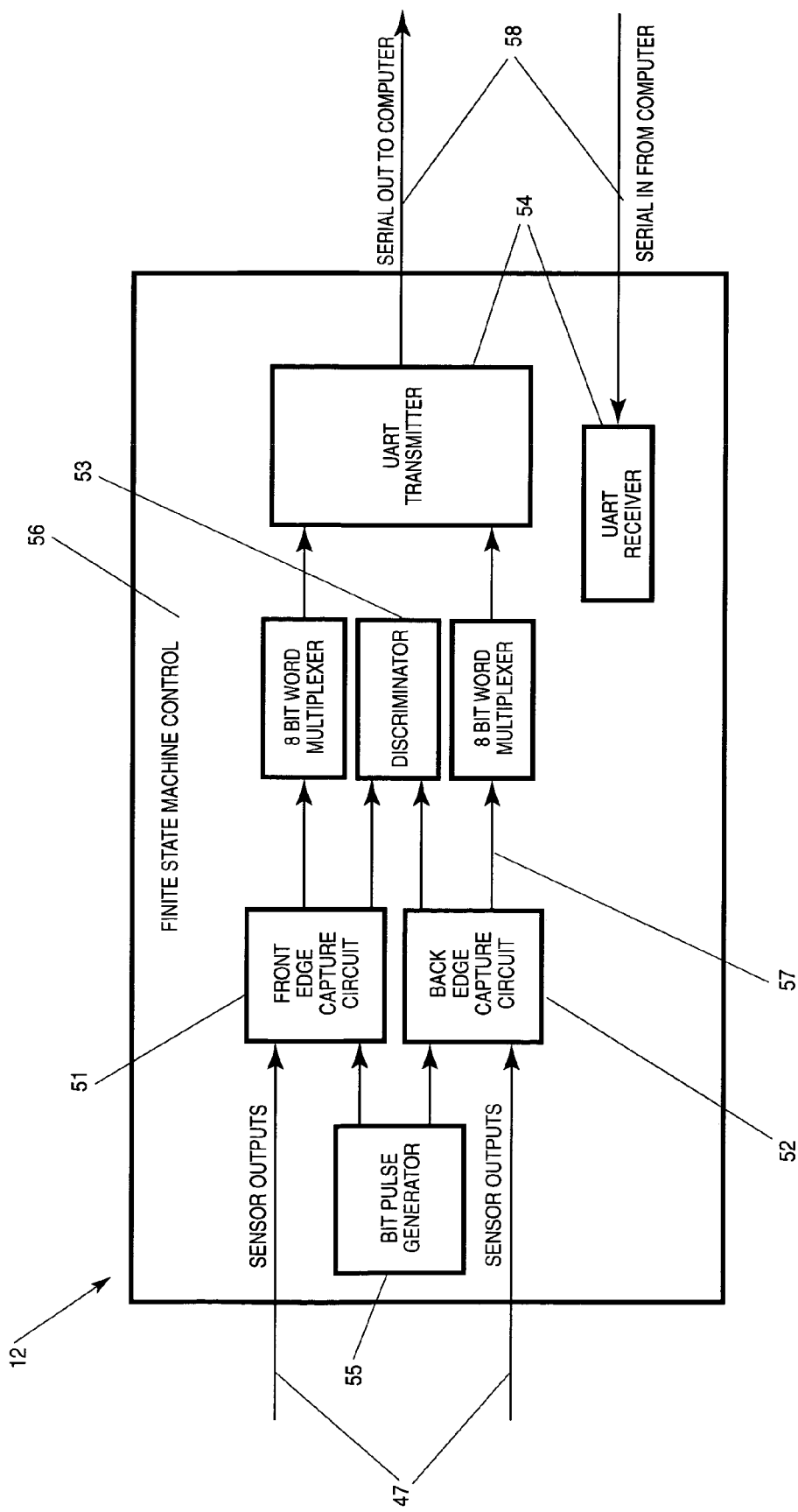
FIG. 5 is a block diagram of the digital resolver module electronics.

Sensor output pulses 47 are fed through electrical cable 17 into and resolved by digital resolver electronics circuit 12 as shown in FIG. 5. Digital resolver electronics 12 consists of leading edge 51 and trailing edge 52 input stages, discriminator stage 53, universal asynchronous receiver-transmitter (UART) communications stage 54, built-in test pulse generator 55, and finite state machine 56 all contained on a micro-electronic programmable logic device (PLD).

Sensor output pulses 47 feed into input stages 51, 52 of digital resolver electronics 12 where both the leading edge and trailing edge of each sensor output pulse 47 is captured asynchronously. In the preferred embodiment, these captured edges start and stop two 16-bit, precision timers located in capture circuits 51, 52, which count at a frequency of 60 MHz. The output of timer circuits 57 along with captured edges 47 are simultaneously fed into discriminator circuit 53 that uses a combination of timer overflow and logic levels to distinguish between a projectile loading event and a projectile firing event. This is necessary since both events will generate sensor output. Once a valid firing event has been detected, the output of precision timers 57 is presented serially 58 through UART 54 and electrical cable 17 to computer device 13 for processing in the form of four 8-bit words. Although these parameters and devices are specifically described for the preferred embodiment, other parameters or devices can be used to provide similar results.

All timing events in digital resolver circuit 12 are controlled by a finite state machine 56. State machine 56 interprets discriminator 53 data to ensure that asynchronous capture circuits 51, 52 can recover from all logical combinations and permeations of loading events in time to capture a valid firing event. State machine 56 also initiates and maintains a serial communication path 58 with the software program running in computer device 13, providing continuous communication health status and firing event data upon occurrence. Upon digital resolver power up, state machine 56 initiates a built-in test (BIT) using built-in test pulse generator 55. This generator 55 provides two pulses that simulate a valid firing event, which are resolved by digital resolver electronics 12, producing four 8-bit words. These words are presented to the software program in the computer device 13 for evaluation, thus proving the functionality of digital resolver electronics 12 at power up.

The design of the preferred digital resolver electronics 12 utilizes low power (micro cell) componentry along with a low power PLD to optimize efficiency. This electrical design allows for a practical battery-powered application. The use of state machine 56 and universal asynchronous receiver-transmitter (UART) 54 in the PLD eliminates the higher cost and power consumption of an on-board microprocessor and independent UART. The PLD used can be reprogrammed while in the circuit allowing for a highly flexible, adaptive and maintainable design.

The precision with which digital resolver 12 is able to measure projectile speed is largely a function of its timer clock speed. Using a 16-bit timer with an on-board oscillator clock speed of 60 MHz, the circuit resolves the sensor output pulse edges 47 down to 16.6666667 nanoseconds (ns) per bit. A calibrated sensor block with an operating trigger spacing of 1.220" will produce a gated pulse of 97.447 microseconds (us) when detecting a projectile fired at the highest nominal round speed of 318 meters per second (mps). Resolving this pulse using the given bit rate, (97.447 us/16.67 ns) gives an end result of 5846 bits (for a projectile speed of 318 mps). This can also be expressed as 0.0544 mps resolution at 318 mps (318/5846). A maximum loss of +/− one clock cycle can occur when going from asynchronous to synchronous within the Input stage. The inclusion of this loss allows precision to be expressed as +/−0.0544 mps. This can be further expressed as 0.017% accuracy at 318 mps. All of the above calculations take place in the computer software interface. Additional losses can occur due to oscillator frequency variation, however, oscillators are preferably selected that perform over a military specified temperature range with a 0.005% variation or better. This introduces only 0.000005% of error at 318 mps and is considered negligible. Other existing systems using RADAR technology claim "an over-all system accuracy of +/−0.05%".

Figure 6:
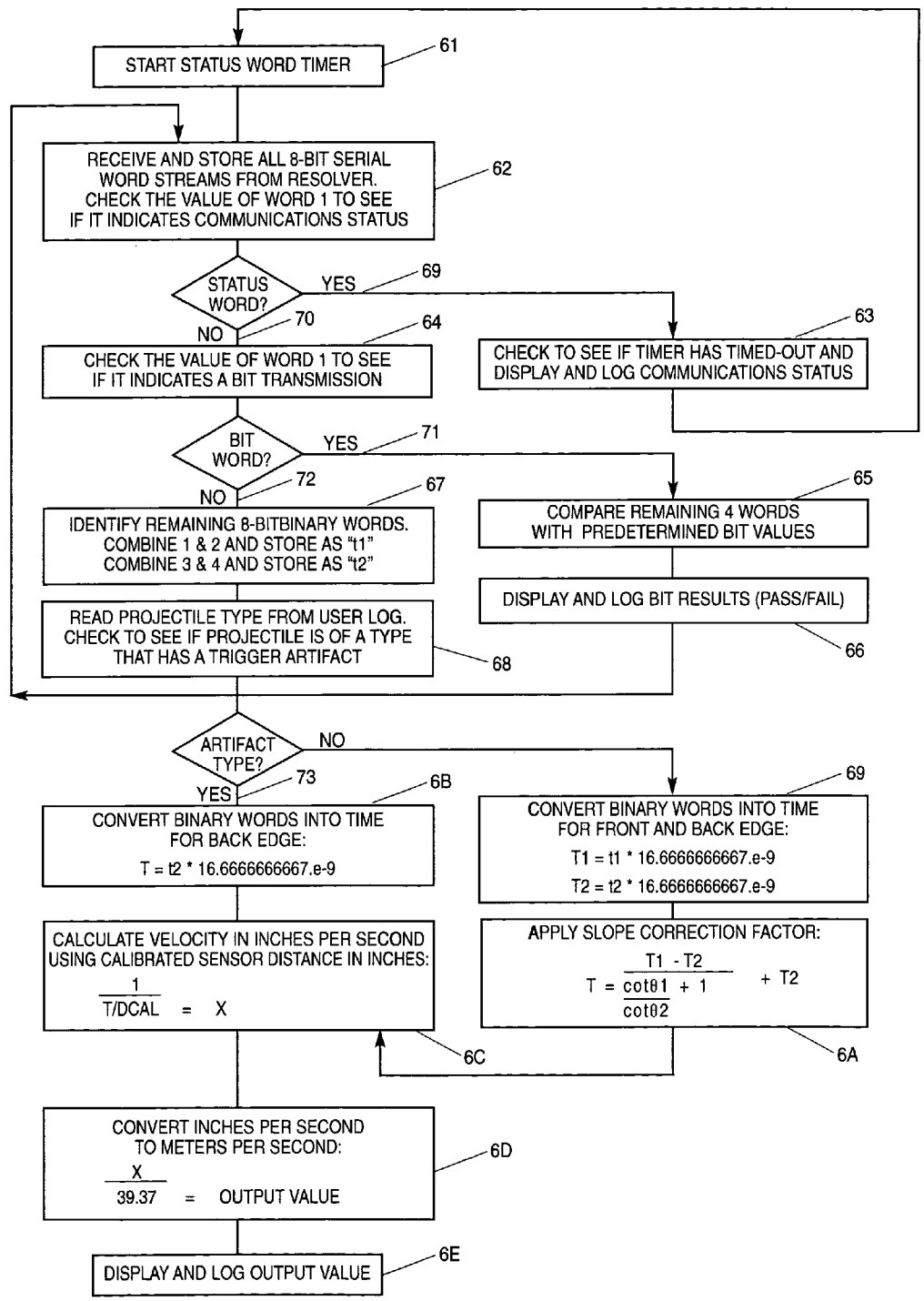
FIG. 6 is a flow chart of the computer software interface.

The preferred computer software interface consists of a Visual C software program developed specifically for this invention that resides in computer device 13. FIG. 6 shows a top level flow chart of the computer software interface program execution process. The first step of the process starts status word timer 61. This is necessary since the computer software interface identifies and logs constant communication health status between the computer device and digital resolver. Next the word streams are monitored and stored 62. The value of the first 8-bit word of the word stream of any transmission received by the computer device will indicate whether the computer software should regard the immediate data as communications status, built-in test (BIT), or actual firing event data. If the value of the first word indicates status word 69 is affirmative, the status is checked to see if the status word timer has timed out, communications status is displayed 63 and the program returns to step 61. If the value of the first word is not a status word 70, then the program branches to check to see if the word value indicates a BIT transmission from the digital resolver 64. If the value does indicate a BIT word 71, the program advances to comparing the remaining words in the stream to predefined values to determine a BIT pass or fail 66. Step 66 then executes to display and log BIT results and returns to step 62. If the value of the first word is not a BIT word 72, the data stream is from a firing event and proceeds to identifying if the binary values of T1 and T2 are derived from the remaining 4 words 67. The program then advances to reading the projectile log 68 where a previously logged value is read to determine the type of projectile being fired. If the projectile has a trigger artifact 73 such as the orbturator ring channel, the program runs subroutine steps 6B, 6C and 6D where the calculations are performed to determine the velocity value 6D. This value is then logged and displayed 6E. In the event the projectile type does not have a trigger artifact 74, then a supplemental set of calculations is performed 69 and subroutine 6A before returning to subroutine 6C.

Figure 7A:
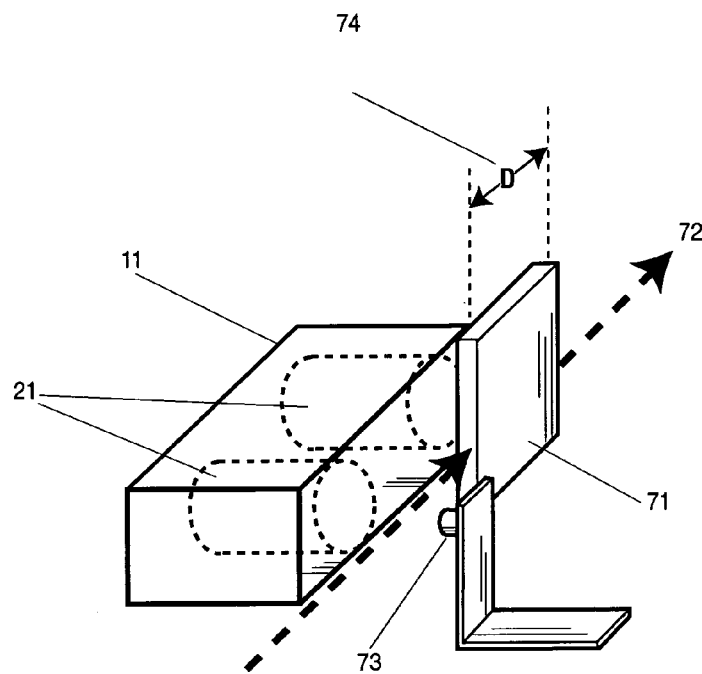
FIG. 7A depicts the preferred method and apparatus for calibration of the sensor block.

An initial calibration of the sensor block is needed before the velocity measurement system can provide precision data. Referring to FIG. 7A, during manufacturing, two Hall effect sensors 21 are permanently encased in a potting material when installed in sensor block 11 to provide shock and thermal isolation. This process makes it difficult to provide a precise (+/−0.0001 inch) distance between two sensors 21 within sensor block 11. Also, the precise (+/−0.0001 inch) trigger point on the face of each sensor is unique to that sensor. These particulars create the need for a one-time calibration of sensor block 11 to determine a calibration value, which will specify within 0.0001 inches the mechanical distance between two sensor release points after they are installed in sensor block 11. This calibration value will be unique for each individual sensor block 11 and permanently associated with sensor block 11 for use by the computer software interface when calculating velocity.

Figure 7B:
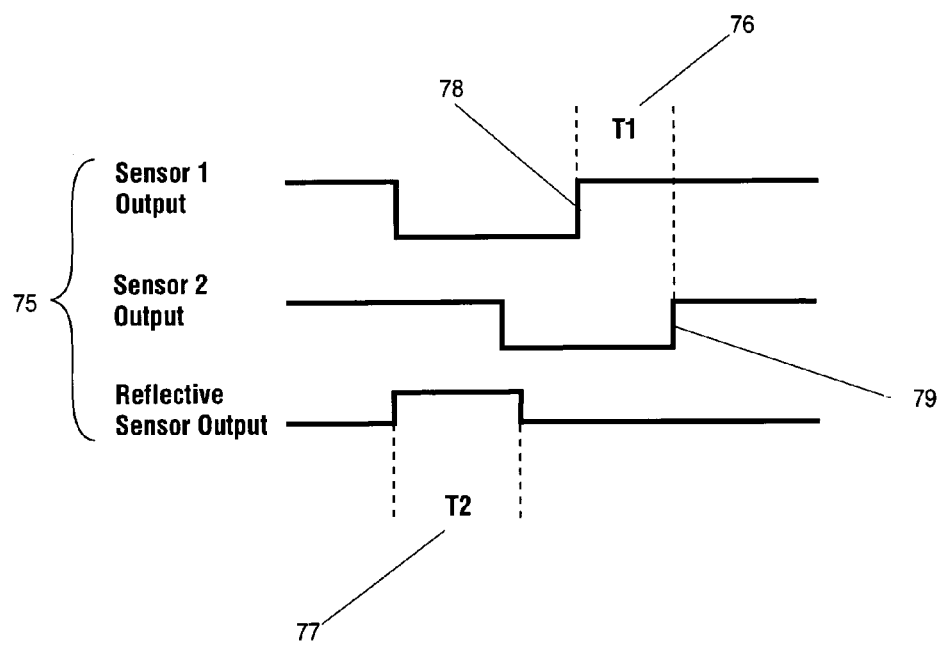
FIG. 7B shows typical oscilloscope output for calibration of the sensor block.

A preferred method of sensor block calibration is depicted in FIG. 7A. A target 71 constructed of low permeability alloy steel equivalent to the mortar round casing is passed in front of sensor block 11 traveling in a path 72 that remains perpendicular and in the same plane as secured sensor block 11. Schmitt trigger photo reflective sensor 73 is suspended opposite sensor block 11 to trigger on the changes in target 71 photo reflectivity as it passes. Target 71 material preferably should be at least 0.1 inch thick and have a surface area of at least 4 inches so as to dissipate the sensor magnetic field. Without this dissipation, residual magnetic flux from the first sensor will be coupled through target 71 and affect the trigger point of the second sensor, corrupting the calibration results. Target 71 width must also be identified to within 0.0001 of an inch. This value is shown as "D" 74 in FIG. 7A and represents the control for the calibration procedure, supplying a known distance between trigger events for photo reflective sensor 73 as well as Hall effect sensors 21. This control is further optimized for calibration precision by using an Inspection Gauge Block as target 71 with an even greater tolerance within 0.00001 inches. The electrical output of both Hall effect sensors 21 and photo reflective sensor 73 can be captured on a digital oscilloscope as target 71 passes. A typical oscilloscope output 75 is shown in FIG. 7B. Because all sensors are triggering off the same target at nearly the same moment in time a direct comparison can be derived from all oscillographic events 75. The speed of the target should be fast enough to capture and store within the oscilloscope memory. Target speeds of 50 to 100 meters per second are typical for this calibration procedure. As target 71 moves past sensor block 11 along path 72, the front and back mechanical edges of target 71 will cause the two Hall effect sensors 21 and reflective sensor 73 to produce changes in their output states. These changes 75 will be captured on the oscilloscope screen and will provide timing measurements T1 76, and T2 77. These timing measurements are used to calculate the calibration value using the following process:

First, determine X (inches per second) using T1 76, T2 77, and D 74.

$$\frac{1}{T2/D} = X$$

Next, calculate T3 which is the difference between T2 77 and T1 76.

$$T2-T1=T3$$

Next, calculate C (calibrated distance variation) by multiplying T3 and X.

$$T3*X=C$$

Last, add C and D 74 to determine the calibration value "Cal".

$$D+C=Cal$$

The value of "Cal" represents the precise distance between the release points 78, 79 for each Hall effect sensor 21 as they are permanently installed in the sensor block 11.

In an alternative embodiment, the velocity measurement system does have additional capability in the event a projectile type 81 as shown in FIG. 8A does not provide a magnetically permeable square mechanical edge 44 on its surface as in FIG. 4A. When reporting a valid firing event, digital resolver electronics 12 presents two additional 8-bit words to a computer device that can be used to calculate velocity based on the average times between rising edges 86 and falling edges 85 of both sensor 21 outputs 84 shown in FIG. 8B. Once this average value is obtained, it is integrated with a slope correction constant that is derived from a trigonometric relationship between the measured front and back mechanical slopes 82, 83 of the projectile type 81. This slope correction constant is calculated using the cotangents of the mechanical slopes 82, 83. Timing measurement calculation 87 compensates for the fact that both sensors 21 may trigger at different points on the sloping face of the projectile due to inconsistencies in sensor trigger/release thresholds. This difference in trigger points is identified by measuring the difference in sensor release points 86, and then averaging them with sensor trigger points 85. The slope correction factor is then applied to compensate for the fact that forward mechanical slope 82 of the projectile is not equal to rear 83.

To utilize this additional capability, the computer software interface reads a user specified text value that defines the projectile type and is entered by the user from the computer device keyboard and stored in a displayable file. The computer software interface then reads this text to determine which set of calculations to perform in order to derive the velocity value. This inherent adaptability of the software interface program was purposely designed into the embodiment of this invention to allow for the future anticipated use of replacement dielectric field proximity sensors which function with non-magnetic composite mortar casing materials.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A system for direct measurement of a muzzle velocity of a projectile, the system comprising:
    at least two back-biased Hall effect sensors disposed on the muzzle for detecting a predetermined point on the projectile;
    a means for calculating the velocity of the projectile from the detected predetermined point from the at least two back-biased Hall effect sensors; and
    a calibrated sensor block for housing the at least two back-biased Hall effect sensors.

2. The system of claim 1 wherein said system further comprises a high-speed single-bit analog-to-digital converter and electronic circuitry for producing a shaped pulse digital transition output.

3. The system of claim 1 wherein said predetermined point comprises an orbturator ring channel on the projectile.

4. The system of claim 1 wherein said predetermined point comprises at least one conical tapered section of the projectile.

5. The invention of claim 1 further comprising a resolver module.

6. The invention of claim 5 wherein said resolver module comprises a means to discriminate between a valid firing event and an invalid firing event.

7. The invention of claim 5 wherein said resolver module comprises a means to convert a captured pulse transition value output from each of the back-biased Hall effect sensors into digitally coded numerical data.

8. The system of claim 5 wherein said resolver module further comprises a built-in test structure for calibration and error detection.

9. The system of claim 1 further comprising a computer for calculating the projectile velocity and providing an indicator of the velocity.

10. A method for directly measuring a muzzle velocity of a projectile, the method comprising the steps of:
   providing at least two back-biased Hall effect sensors disposed on the muzzle for detecting a predetermined point on the projectile;
   housing the at least two back-biased Hall effect sensors in a sensor block;
   calibrating the sensor block; and
   calculating the velocity of the projectile from the detected predetermined point from the at least two back-biased Hall effect sensors.

11. The method of claim 10 wherein the step of detecting a predetermined point comprises detecting an orbturator ring channel on the projectile.

12. The method of claim 10 wherein the step of detecting a predetermined point comprises detecting at least one conical tapered section of the projectile.

13. The method of claim 10 further comprises the step of providing a resolver module.

14. The method of claim 13 further comprising the step of discriminating between a valid firing event and an invalid firing event by the resolver module.

15. The method of claim 14 wherein the step of step of discriminating comprises maintaining the resolver module in a state of readiness for capturing a valid firing event.

16. The method of claim 13 further comprising the step of converting an a captured pulse transition value output from each of the back-biased Hall effect sensors into digitally coded numerical data.

17. The method of claim 13 further comprising the step of calibrating and detecting errors by the resolver module.

18. The method of claim 10 further comprising calculating the projectile velocity and providing an indicator of the velocity by a computing device.

* * * * *